United States Patent

Yamamoto et al.

[11] Patent Number: 5,145,884
[45] Date of Patent: Sep. 8, 1992

[54] ULTRAVIOLET-HARDENABLE ADHESIVE

[75] Inventors: Yasuyoshi Yamamoto, Komaki; Yuzo Kaga; Toshiharu Yoshikawa, both of Nagoya; Akira Moribe, Inazawa, all of Japan

[73] Assignee: Menicon Co., Ltd., Aichi, Japan

[21] Appl. No.: 568,020

[22] Filed: Aug. 16, 1990

Related U.S. Application Data

[62] Division of Ser. No. 426,203, Oct. 25, 1989, Pat. No. 5,007,975.

[51] Int. Cl.$^5$ .............................................. C08F 18/02
[52] U.S. Cl. ........................................ 522/14; 522/17;
522/18; 522/33; 522/34; 522/37; 522/39;
522/38; 522/40; 522/44; 522/46; 522/53;
522/55; 522/60; 522/181; 522/182
[58] Field of Search .................... 555/181, 182, 33, 34,
555/37, 38, 39, 40, 44, 46, 53, 55, 60, 14, 17, 18;
430/285; 156/273.7, 275.5, 275.7

[56] References Cited

U.S. PATENT DOCUMENTS

| | | | |
|---|---|---|---|
| 4,322,490 | 3/1982 | Molaire . | |
| 4,619,082 | 10/1986 | Dent et al. . | |
| 4,636,534 | 1/1987 | Nawata et al. | 522/182 |
| 4,764,452 | 8/1988 | Ohno | 430/285 |
| 4,908,283 | 3/1990 | Takahashi et al. | 522/181 |

FOREIGN PATENT DOCUMENTS 62-34149  2/1987  Japan ................... 430/285

*Primary Examiner*—Marion E. McCamish
*Assistant Examiner*—Christopher D. Rodee
*Attorney, Agent, or Firm*—Oliff & Berridge

[57] ABSTRACT

An ultraviolet-hardenable adhesive for bonding a non-water swellable, ophthalmic-lens to a support member, in producing a non-water swellable ophthalmic lens, the adhesive containing at least one photopolymerizing monomer, and at least one photoinitiator, the at least one photopolymerizing monomer being selected from the group consisting of acrylates or methacrylates represented by following general formulas (I) and (II):

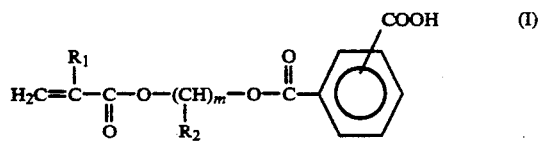

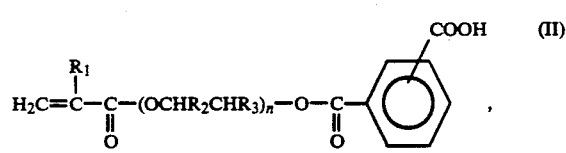

wherein
$R_1$ is hydrogen or methyl,
$R_2$ is hydrogen or methyl,
$R_3$ is hydrogen or methyl,
m is a positive integer from 2 to 20, and
n is a positive integer from 1 to 5.

A method of bonding a lens blank to a support member with an adhesive, and a processing of manufacturing a lens using an adhesive, are also disclosed.

6 Claims, 1 Drawing Sheet

ULTRAVIOLET-HARDENABLE ADHESIVE

This is a division of application Ser. No. 07/426,203, filed Oct. 25, 1989, now U.S. Pat. No. 5,007,975.

BACKGROUND OF THE INVENTION

1. Field of the Invention

The present invention relates to an ultraviolet-hardenable adhesive for bonding a non-water swellable, ophthalmic-lens blank to a support member in producing a desired ophthalmic lens such as a contact lens and an intraocular lens, a method of bonding an ophthalmic-lens blank to a support member with an adhesive, and a process of producing an ophthalmic lens using an adhesive.

2. Discussion of the Prior Art

Various adhesives are available for industrial and domestic uses. In particular, when an ophthalmic-lens blank is subjected to workings such as machining and polishing and/or necessary treatments in producing an ophthalmic lens such as a contact lens and an intraocular lens, an adhesive is used to bond the lens blank to a support member. Since the worked lens must be separated from the support member, it is required to use an adhesive which permits the lens to easily be separated from the support member.

U.S. Pat. No. 4,619,082 (Dent et al.), teaches use of a molten wax for bonding a lens blank to a support member. Molten wax normally melts at 60° to 70° C., and the wax in molten state is used as an adhesive. Therefore, if it takes a comparatively long time to finish the step of bonding the lens block to the support member, the wax is hardened during the step, whereby the lens blank may not accurately be positioned relative to the support member.

Further, it has been proposed to use other sorts of adhesives, for example a room temperature-hardenable adhesive, a cyanoacrylate-type adhesive ("instant adhesive") and a two-part adhesive. The room temperature-hardenable adhesive has the same problem as the above-indicated molten wax, because this adhesive is hardened due to moisture in ambient air, which acts as a catalyst. Specifically, if a comparatively long time is taken to finish the bonding step, the adhesive is hardened during the step. Thus, the adhesive is of low controllability and not suitable for the purpose. Meanwhile, in the case of the cyanoacrylate-type adhesive, a lens blank is instantly secured to a support member due to the specific nature of the adhesive, therefore the lens blank may not accurately be positioned relative to the support member. Furthermore, the adhesive of this type exhibits an excessively high bonding force, accordingly the produced lens may not easily be separated from the support member after having been subjected to the workings and/or treatments. The two-part adhesive has the problem of low controllability in use for bonding a lens blank to a support member, because the adhesive is hardened upon mixture of the two parts or fluids.

SUMMARY OF THE INVENTION

It is therefore an object of the present invention to provide an ultraviolet-hardenable adhesive, which does not adversely influence or damage the lens blank or the worked lens, used for bonding a non-water swellable, ophthalmic-lens blank to a support member in producing an ophthalmic lens such as a contact lens and an intraocular lens, a method of bonding an ophthalmic-lens blank to a support member with an adhesive, and a process of producing an ophthalmic lens using an adhesive.

It is another object of the invention to provide a bonding technique used for bonding a lens blank to a support member in producing a required ophthalmic lens.

It is yet another object of the invention to provide a bonding technique free from the problem of inaccurate positioning of a lens blank relative to a support member, by employing an ultraviolet-hardenable adhesive which is not instantly hardened and is controllable regarding a time to initiate the hardening thereof, and which does not adversely influence, or damage, the lens blank or the worked lens.

The above objects have been achieved by the present invention. According to a first aspect of the invention there is provided an ultraviolet-hardenable adhesive used for bonding a non-water swellable, ophthalmic-lens blank to a support member, in producing a non-water swellable ophthalmic lens, comprising at least one photopolymerizing monomer, and at least one photoinitiator, the at least one photopolymerizing monomer being selected from the group consisting of acrylates or methacrylates represented by following general formulas (I) and (II):

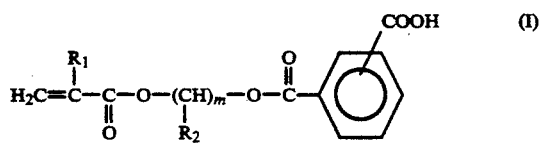

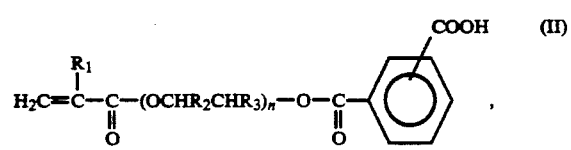

wherein $R_1$ is hydrogen or methyl;
$R_2$ is hydrogen or methyl;
$R_3$ is hydrogen or methyl;
m is a positive integer from 2 to 10; and
n is a positive integer from 1 to 5.

The above-indicated ultraviolet-hardenable adhesive is very suitable for bonding a non-water swellable ophthalmic-lens blank to a support member, in producing a non-water swellable ophthalmic lens such as a contact lens and an intraocular lens, specifically by subjecting the lens blank bonded to the support member to workings such as machining and polishing, and/or necessary other treatments. In particular, the present adhesive provides the advantages of: (a) exhibiting no adverse influences to the standards on lenses (e.g., base curve, power), the lens surfaces, or the lens material; (b) being free from the problem of inaccurate positioning of the lens material with respect to the support member, because the adhesive is not hardened instantly; (c) exhibiting a sufficient bonding force which enables workings such as machining and polishing on the lens blank bonded to the support member, and which permits the worked lens to easily be separated from the support member, without any adverse influences to the lens; and (d) being controllable regarding a time to initiate the hardening thereof and thereby having improved utility or ease to use.

In a preferred embodiment of the invention, the ultraviolet-hardenable adhesive further comprises at least one separation-promoting monomer for promoting separation of the bonded ophthalmic lens and support member from each other, the at least one separation-promoting monomer being selected from the group consisting of ethylenically unsaturated compounds represented by the following general formula (III):

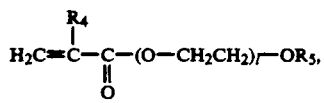

wherein
R₄ is hydrogen or methyl,
R₅ is hydrogen or methyl, and
l is a positive integer from 2 to 30.

In another embodiment of the invention, the ultraviolet-hardenable adhesive further comprises at least one photosensitizer.

In yet another embodiment of the invention, the ultraviolet-hardenable adhesive further comprises at least one of photopolymerizing comonomer, stabilizer, filler, and other adhesive additives.

According to a second aspect of the present invention, there is provided a method of bonding a non-water swellable, ophthalmic-lens blank to a support member so as to subject the ophthalmic-lens blank to working and/or treatment, in producing a non-water swellable ophthalmic lens, comprising the steps of: preparing an ultraviolet-hardenable adhesive comprising at least one photopolymerizing monomer and at least one photoinitiator, the at least one photopolymerizing monomer being selected from the group consisting of acrylates or methacrylates represented by following general formulas (I) and (II):

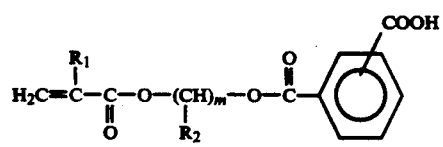

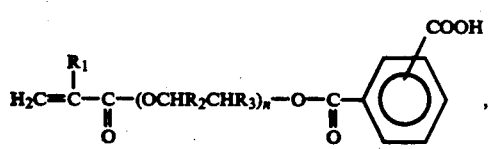

wherein
R₁ is hydrogen or methyl,
R₂ is hydrogen or methyl,
R₃ is hydrogen or methyl,
m is a positive integer from 2 to 10, and
n is a positive integer from 1 to 5, and
bonding the ophthalmic-lens blank to the support member with the ultraviolet-hardenable adhesive.

According to a third aspect of the present invention, there is provided a process of producing a non-water swellable, ophthalmic lens, comprising the steps of (a) preparing an ultraviolet-hardenable adhesive comprising at least one photopolymerizing monomer and at least one photoinitiator, the at least one photopolymerizing monomer being selected from the group consisting of acrylates or methacrylates represented by following general (I) and (II):

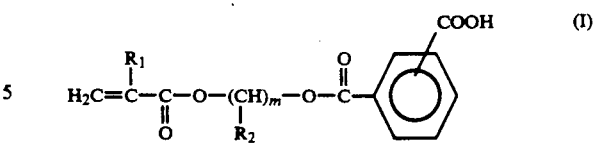

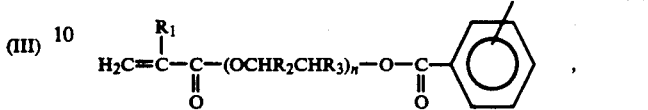

wherein
R₁ is hydrogen or methyl,
R₂ is hydrogen or methyl,
R₃ is hydrogen or methyl,
m is a positive integer from 2 to 10, and
n is a positive integer from 1 to 5;
(b) bonding a non-water swellable, ophthalmic-lens blank to a support member with the ultraviolet-hardenable adhesive, (c) exposing the bonded ophthalmic-lens blank and support member to ultraviolet rays so as to harden the adhesive, and (d) subjecting the ophthalmic-lens blank to working and/or treatment so as to form the lens blank into a desired non-water swellable ophthalmic lens, and (e) separating the ophthalmic lens from the support member.

In the above-indicated producing process, the lens blank bonded to the support member with the ultraviolet-hardenable adhesive, may be subjected to working such as machining and polishing. After the working and/or treatment, the produced lens is separated from the support member, preferably by treating the bonded articles with an alkaline aqueous solution, for example immersing the articles in the solution. In the water solution, the non-water swellable lens is not deformed or swollen, while the ultraviolet-hardenable adhesive is swollen as a result of absorbing water. Thus, the lens is easily separated from the support member.

DETAILED DESCRIPTION OF THE INVENTION

Figure 1:
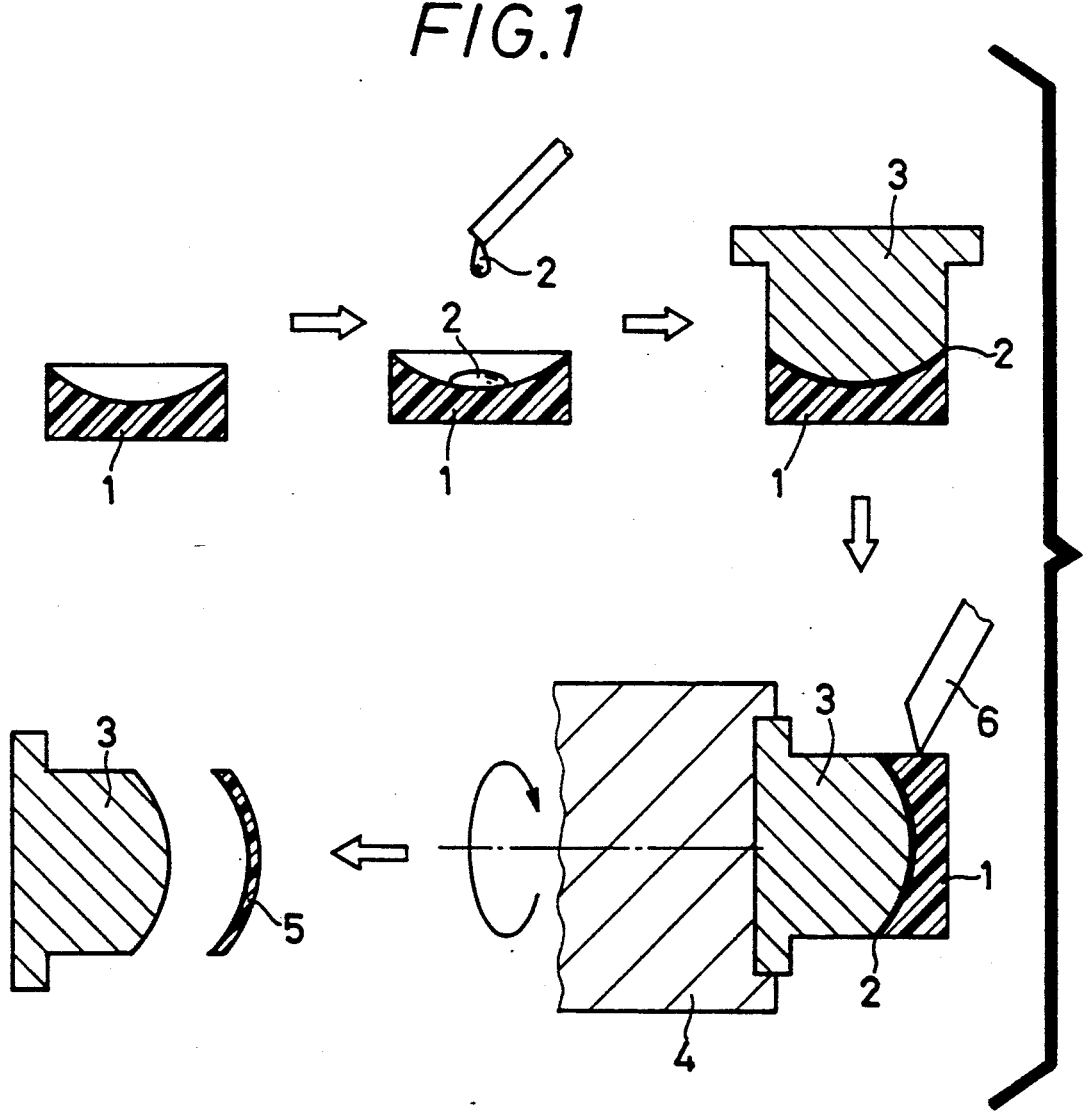
FIG. 1 is an illustrative view of some steps carried out to form an ophthalmic-lens block into a required ophthalmic lens.

The above and optional objects, features and advantages of the present invention will be better understood by reading the following detailed description of the invention.

The present invention provides an ultraviolet-hardenable adhesive containing at least one photopolymerizing monomer. Each of the at least one photopolymerizing monomer is selected from the group consisting of acrylates or methacrylates represented by the following general formulas (I) and (II):

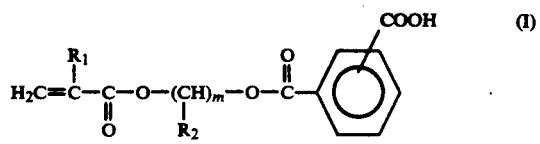

-continued

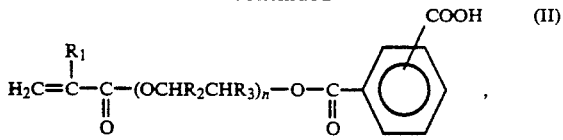

wherein
- $R_1$ is hydrogen or methyl,
- $R_2$ is hydrogen or methyl,
- $R_3$ is hydrogen or methyl,
- m is a positive integer from 2 to 10, and
- n is a positive integer from 1 to 5.

The above $R_1$, $R_2$ and $R_3$ may be either identical with each other, or different from each other.

The present ultraviolet-hardenable adhesive containing at least one photopolymerizing monomer represented by the above formula (I) or (II), is advantageously used to bond a non-water swellable (or absorbable), ophthalmic-lens blank to a support member, since the adhesive permits the bonded articles to easily be separated from each other. The adhesive is soluble in an alkaline water solution, for example of pH 8 to 12 which does not adversely affect the material of the lens (block), so that the lens is easily separated from the support member.

The present ultraviolet-hardenable adhesive further contains at least one separation-promoting monomer (ethylenically unsaturated compound) represented by the following general formula:

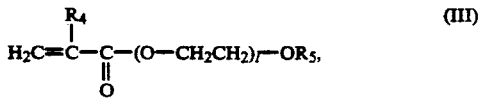

wherein
- $R_4$ is hydrogen or methyl,
- $R_5$ is hydrogen or methyl, and
- l is a positive integer from 2 to 30.

The separation-promoting monomer is water soluble, and serves to promote swelling of the hardened adhesive and thereby separate the bonded articles from each other. If the above l is below the lower limit, 2, the separation-promoting monomer tends to exhibit adverse effects against the lens material. Preferably the l is more than 4. As the l is increased, the separation-promoting monomer tends to be solid at room temperature, making it difficult to be mixed with the photopolymerizing monomer. For this reason the upper limit of the l is 30. Preferably the l is not more than 20.

It is recommended that the ultraviolet-hardenable adhesive contain 80 to 0 parts by weight of the at least one separation-promoting monomer per 100 parts by weight of the sum of the at least one photopolymerizing monomer and the at least one separation-promoting monomer, namely, together with 20 to 100 parts by weight of the at least one photopolymerizing monomer. Preferably the adhesive contains 40 to 80 parts by weight of the at least one photopolymerizing monomer and 60 to 20 parts by weight of the at least one separation-promoting monomer, per 100 parts by weight of the sum of the two monomers. If the proportion of the at least one photopolymerizing monomer is below the lower limit, 20 parts by weight, namely, if the proportion of the at least one separation-promoting monomer exceeds the upper limit, 80 parts by weight, the bonding force produced by the ultraviolet-hardenable adhesive is reduced to an insufficient level.

The present adhesive further contains one or more photoinitiators for polymerizing the photopolymerizing monomer. The photoinitiators absorb ultraviolet and thereby initiate the polymerization of the photopolymerizing monomer. Preferably are used photoinitiators having an ultraviolet absorption region of 300 to 450 nm. The recommendable photoinitiators are as follows: acetophenone, and its derivatives such as dichloroacetophenone, trichloroacetophenone, dialkoxyacetophenone, 2, 2-dimethoxy-2-phenylacetophenone and 4-dialkylaminoacetophenone; benzophenone, and its derivatives such as 4, 4'-bis(dimethylamino)benzophenone (Michler's ketone) and 4, 4'-bis(diethylamino)benzophenone; benzil; benzoin, and its derivatives such as benzoin alkyl ether; benzildimethylketal; benzoylbenzoate; α-acyloxime esters; tetramethylthiuram monosulfide; thioxanthone, and its derivatives such as 2-chlorothioxanthone and diethylthioxanthone; azo-compounds such as azobisisobutyronitrile; benzoyl peroxide, di-tert-butyl peroxide, and its derivatives, and benzoyldiethoxyphosphine oxide and trimethylbenzoyldiphenylphosphine oxide. The photoinitiators may be used solely or in combination.

In the above-indicated various photoinitiators, preferably are used (a) benzoin and its derivatives represented by the following general formula:

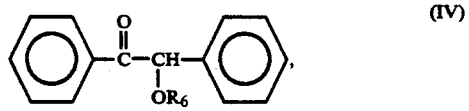

wherein
- $R_6$ is hydrogen, alkyl group (preferably, lower alkyl group such as methyl, ethyl, isopropyl or isobutyl), or substituted alkyl group; (b) benzil; (c) benzophenone; (d) acetophenone; and (e) azobisisobutyronitrile.

The ultraviolet-hardenable adhesive contains 0.1 to 4 parts by weight of the at least one photoinitiator per 100 parts by weight of the sum of the at least one photopolymerizing monomer and the at least one separation-promoting monomer. Preferably the adhesive contains 0.5 to 2 parts by weight of the at least one photoinitiator per 100 parts by weight of the sum of the two monomers. If the proportion of the at least one photoinitiator used is below the lower limit, 0.1 part by weight, the time required to harden the adhesive is increased to be excessively long. Meanwhile, if the proportion is above the upper limit, 4 parts by weight, the hardening characteristics of the adhesive is saturated, namely, is no longer increased, on the other hand the cost of the product (ultraviolet-hardenable adhesive) is raised.

The ultraviolet-hardenable adhesive may further contain at least one photosensitizer in addition to the at least one photoinitiator. The photosensitizer itself is not activated due to exposure to ultraviolet, but when the photosensitizer is used together with the photoinitiator the photoinitiator more effectively acts upon exposure to ultraviolet than when used solely. The preferable photosensitizers are as follows: amine derivatives such as n-butylamine, di-n-butylamine, trimethylamine and triethylamine; tri-n-butylphosphine; allylthiourea; s-benzylisothiuram-p-toluene sulfinate; and diethylaminoethyl methacrylate.

The present ultraviolet-hardenable adhesive may additionally contain at least one of photopolymerizing comonomer, stabilizer, filler, and other adhesive additives such as pigment, inert organic polymer, leveling agent, thixotropic additive, thermal-polymerization inhibitor, and solvent. The photopolymerizing comonomer serves as a diluent for the photopolymerizing monomer and thereby permits the adhesive to easily be used. The comonomer is copolymerized with the photopolymerizing monomer upon exposure to ultraviolet rays. The comonomer may be either a monofunctional monomer having a single functional group, or a polyfunctional monomer having two or more functional groups. One or more of (meth) acrylates and (meth) acrylate derivatives may be used as the comonomer.

The ultraviolet-hardenable adhesive having the composition described above is used to bond a non-water swellable, ophthalmic-lens blank to a support member. The bonded articles are exposed to ultraviolet rays at an appropriate time to initiate the polymerization and thereby secure the lens blank to the support member. The ultraviolet exposure is effected by utilizing ultraviolet rays of about 200 to 450 nm generated by an exposing device such as a high-pressure mercury lamp or a metal-halide lamp. The exposure is continued for about 5 seconds to 10 minutes so as to polymerize the photopolymerizing monomer and thereby harden the adhesive.

The lens blank secured to the support member is subjected to workings such as machining and polishing, and/or necessary treatments, so as to form the lens blank into a desired ophthalmic lens.

Referring to FIG. 1, there are illustrated some steps of producing an ophthalmic lens using the above-described ultraviolet-hardenable adhesive. Reference numeral 1 designates a non-water swellable, ophthalmic-lens blank or block having a shaped concave surface. Some drops of the adhesive 2 are put on the concave surface of the lens block 1. Subsequently, a support member 3 having a curvature substantially equal to that of the concave surface of the lens block 1, is superposed on the lens block 1 such that the lens block 1 is accurately positioned relative to the support member 3. The bonded lens block 1 and support member 3 are exposed to ultraviolet rays generated by an exposing device, so as to harden the adhesive and thereby secure the lens block 1 to the support member 3. After the adhesive has been sufficiently hardened, the support member 3 supporting the lens block 1 thereon is mounted on a spindle 4 of a machine tool so that the lens block 1 is subjected to workings such as machining and polishing, and/or necessary treatments. Thus, the lens block 1 is worked into a desired ophthalmic lens 5. Reference numeral 6 designates a cutting tool. The ultraviolet exposure of the adhesive may be effected either from the side of the lens block 1 or from the side of the support member 3. In the latter case, it is preferred that the support member 3 consists of a transparent, colorless member.

After the ophthalmic-lens block 1 is formed into the required ophthalmic lens 5 by working and/or treatment, the ophthalmic lens 5 is removed from the spindle 4, and then separated from the support member 3. The separation of the ophthalmic lens 5 from the support member 3 is effected in a suitable alkaline or acid aqueous solution. In particular, the ophthalmic lens 5 is advantageously separated from the support member by immersing the bonded lens 5 and support member 3 in an alkaline water solution of pH about 9 to 12 for 5 seconds to 10 minutes. It is preferred that the temperature of the water solution used be maintained at room temperature to 45° C. Compounds such as sodium carbonate, caustic soda (sodium hydroxide) or sodium hydrogencarbonate may be used to prepare a suitable alkaline aqueous solution.

There will be described some examples of the ultraviolet-hardenable adhesive in accordance with the present invention. However, it is to be understood that the present invention is by no means limited to the particularities of the examples. The terms "part(s)" and "%"(percentage) used in the following description are on a weight basis, namely, mean part(s) by weight and % by weight, respectively. Also, the characters "A", "B" and "C" used in the following examples indicate the photopolymerizing monomer, separation- promoting monomer and photoinitiator, respectively.

EXAMPLE 1

The following constituents A1, B1, and C1 having the respective proportions (parts) are mixed with each other to prepare an ultraviolet-hardenable adhesive of the invention.

Constituent A1 (60 parts):
(methacryloyloxyethyl monoester of terephthalic acid)

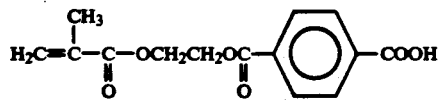

Constituent B1 (40 parts):
(tetraethyleneglycol methacrylate)

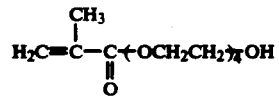

Constituent C1 (1 part):
(benzoin ethyl ether)

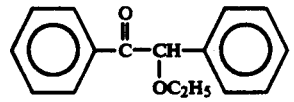

EXAMPLE 2

The following constituents A2, B2, and C2 having the respective proportions (parts) are mixed with each other to prepare an ultraviolet-hardenable adhesive of the invention.

Constituent A2 (75 parts):
(acryloyloxyisopropyl monoester of phthalic acid)

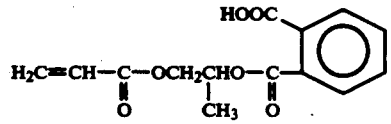

Constituent B2 (25 parts):
(methoxypolyethyleneglycol acrylate)

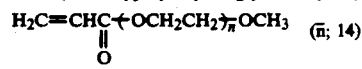

Constituent C2 (1 part):
(benzoin isopropyl ether)

-continued

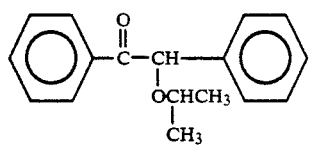

EXAMPLE 3

The following constituents A3, B3, and C3 having the respective proportions (parts) are mixed with each other to prepare an ultraviolet-hardenable adhesive of the invention.

Constituent A3 (70 parts):
 (acryloyloxypropyl monoester of phthalic acid)

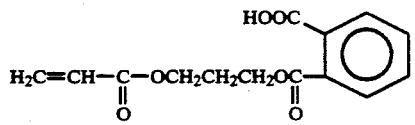

Constituent B3 (30 parts):
 (methoxypolyethyleneglycol methacrylate)

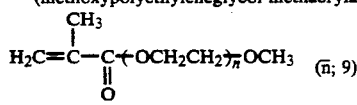 (n̄; 9)

Constituent C3 (0.5 part):
 (benzoin ethyl ether)

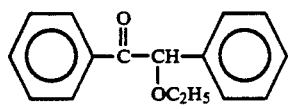

EXAMPLE 4

The following constituents A4, B4, and C4 having the respective proportions (parts) are mixed with each other to prepare an ultraviolet-hardenable adhesive of the invention.

Constituent A4 (55 parts):
 (acryloyloxyethyloxyethyl monoester of phthalic acid)

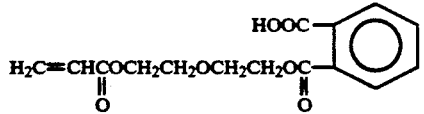

Constituent B4 (45 parts):
 (hexaethyleneglycol acrylate)

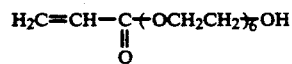

Constituent C4 (1 part):
 (benzoin isobutyl ether)

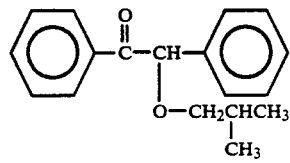

EXAMPLE 5

The following constituents A51, A52, B5, and C5 having the respective proportions (parts) are mixed with each other to prepare an ultraviolet-hardenable adhesive of the invention Constituent A51 (42.5 parts):
 (acryloyloxyethyl monoester of phthalic acid)

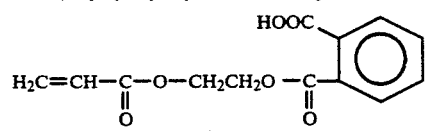

Constituent A52 (15 parts):
 (acryloyloxyisopropyl monoester of phthalic acid)

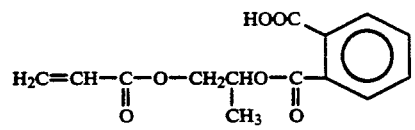

Constituent B5 (42.5 parts):
 (methoxypolyethyleneglycol methacrylate)

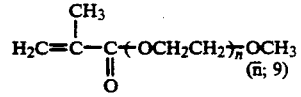 (n̄; 9)

Constituent C5 (2 part):
 (benzoin ethyl ether)

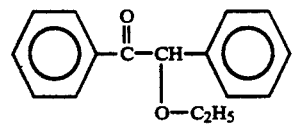

EXAMPLE 6

3 μl of the ultraviolet-hardenable adhesive of Example 1 was dropped on the shaped inner surface of an acrylate-resin lens block for a standard hard contact lens. Subsequently, a support member having a convex curvature substantially equal to that of the inner surface of the lens block, was superposed on the lens block such that the curved surface of the support member is accurately aligned with the inner surface of the lens block. Further, the bonded lens block and support member were exposed to ultraviolet rays under a mercury lamp for about 30 seconds, so as to harden the adhesive and thereby secure the lens block to the support member. Then the support member supporting the lens block thereon was mounted on a spindle of a machine tool, and the lens block was machined and polished. Thus, the lens block was worked into a desired ophthalmic lens. These operations were carried out without producing any problems. The ultraviolet-hardenable adhesive exhibited a high bonding characteristic, namely, a sufficient bonding force.

Then, the support member having the lens adhered thereto was immersed in a 2% sodium-carbonate water solution (pH 11) at 40° C. for 3 minutes. Consequently, it was found that the lens was completely separated from the support member. Then, the surfaces of the lens were inspected with a magnifying glass of 10 magnifications. The inspection showed that the surfaces of the lens were smooth and did not have any influences from the adhesive or the sodium carbonate in the solution.

EXAMPLE 7

With the ultraviolet-hardenable adhesive of Example 2, a lens block was adhered to a support member like Example 6, except that the exposure to ultraviolet rays was continued for 1 minute. The workings of the lens block into a desired lens, by machining and/or polishing, were carried out without any problems.

After the above workings, the support member having the lens thereon was immersed in a 2% sodium-carbonate aqueous solution (pH 11) for 4 minutes. When the support member and lens were removed from the solution, the two articles were separate from each other. The surfaces of the lens were smooth.

EXAMPLE 8

With the ultraviolet-hardenable adhesive of Example 3, a lens block was adhered to a support member like Example 6. The workings of the lens block into a desired lens, by machining and/or polishing, were carried out without any problems.

After the above workings, the support member having the lens thereon was immersed in an alkaline water solution like Example 6. The support member and the lens were completely separated from each other without any problems. The surfaces of the lens were smooth.

EXAMPLE 9

With the ultraviolet-hardenable adhesive of Example 5, a lens block was adhered to a support member like Example 6. The workings of the lens block into a desired lens, by machining and/or polishing, were carried out without any problems.

After the above workings, the support member having the lens thereon was immersed in a 2% sodium-hydrogencarbonate aqueous solution (pH 8-9). The support member and the lens were completely separated from each other. The surfaces of the lens were smooth.

EXAMPLE 10

The ultraviolet-hardenable adhesive of Example 1 was applied onto the shaped inner surface of a lens block, and subsequently the lens block was bonded to a glass member having a curvature substantially equal to that of the inner surface of the lens block. The bonded lens block and glass member were exposed to ultraviolet rays emitted by a black-light lamp for 5 minutes, so as to harden the adhesive and thereby secure the lens block to the glass member. The curvature of the inner surface of the lens block was measured two times, namely, one before the bonding, and another after the hardening of the adhesive. The test results on three lens blocks are indicated in TABLE I. It was proved that the curvature of the inner surface of the lens block was not influenced by the bonding of the lens block to the support member or the hardening of the adhesive.

TABLE I

| No. | Curvature of Inner Surface (mm) | | |
|---|---|---|---|
| | Before Bonding | After Hardening | Difference |
| 1 | 8.39 | 8.40 | +0.01 |
| 2 | 8.41 | 8.41 | 0 |
| 3 | 8.42 | 8.41 | −0.01 |

COMPARATIVE EXAMPLE 1

Using a commercially available, room temperature-hardenable adhesive ("CEMEDINE HIGHSUPER" available from CEMEDINE K. K, Japan.), in place of the ultraviolet-hardenable adhesive of Example 1, a lens block was bonded to a glass member, and the curvature of an inner surface of the lens block was measured two times before the bonding and after the hardening of the adhesive, like Example 10. The test results on three lens blocks are indicated in TABLE II. As is apparent from the results, the conventional adhesive adversely influences the curvature of the concave surface of the lens block.

TABLE II

| No. | Curvature of Inner Surface (mm) | | |
|---|---|---|---|
| | Before Bonding | After Hardening | Difference |
| 1 | 7.30 | 7.25 | −0.05 |
| 2 | 7.70 | 7.62 | −0.08 |
| 3 | 8.30 | 8.20 | −0.10 |

COMPARATIVE EXAMPLE 2

Using a commercially available, pressure sensitive adhesive ("BOND KH-303" available from KONISHI K. K., Japan), a lens block was adhered to a support member like Example 6, and the lens block was subjected to machining. However, during the machining the lens block fell off the support member, and the working could not be continued. The bonding force produced by the conventional adhesive would have been insufficient, and the lens block would not have been fixedly adhered to the support member with a sufficient bonding force.

COMPARATIVE EXAMPLE 3

Using a commercially available, cyanoacrylate-type adhesive ("HIGHSOL 'SUPERDROP' IEC-5" available from TORAY K. K., Japan), a lens block was bonded to a support member, and then was machined and polished. These workings could be effected, but the worked lens could not be separated from the support member without breaking or damaging the lens.

It is to be understood that the present invention may be embodied with various modifications, changes and improvements that may occur to those skilled in the art without departing from the spirit and scope of the invention defined in the appended claims.

What is claimed is:

1. An ultraviolet-hardenable adhesive used for bonding a non-water swellable, ophthalmic-lens blank to a support member, in producing a non-water swellable ophthalmic lens, the adhesive consisting essentially of:
   at least one photopolymerizing monomer;
   at least one separation-promoting monomer for promoting separation of the bonded lens and support member from each other; and
   at least one photoinitiator;
   said at least one photopolymerizing monomer being selected from the group consisting of acrylates or methacrylates represented by following general formulas (I) and (II):

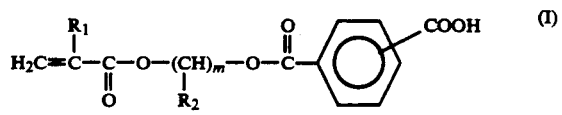

-continued

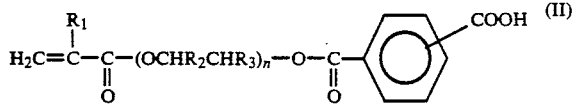

wherein
R₁ is hydrogen or methyl,
R₂ is hydrogen or methyl,
R₃ is hydrogen or methyl,
m is a positive integer from 2 to 10, and
n is a positive integer from 1 to 5;
said at least one separation-promoting monomer being selected from the group consisting of ethylenically unsaturated compounds represented by a following general formula (III):

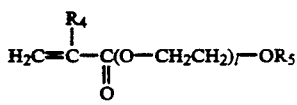

wherein
R₄ is hydrogen or methyl,
R₅ is hydrogen or methyl, and
l is a positive integer from 4 to 20;
the adhesive containing 40 to 80 parts by weight of said at least one photopolymerizing monomer and 60 to 20 parts by weight of said at least one separation-promoting monomer, per 100 parts by weight of the sum of said at least one photopolymerizing monomer and said at least one separation-promoting monomer; and
the adhesive containing 0.1 to 4 parts by weight of said at least one photoinitiator per 100 parts by weight of the sum of said at least one photopolymerizing monomer and said at least one separation promoting monomer.

2. The ultraviolet-hardenable adhesive as set forth in claim 1, wherein the ultraviolet-hardenable adhesive contains 0.5 to 2 parts by weight of said at least one photoinitiator per 100 parts by weight of the sum of said at least one photopolymerizing and said at least one separation-promoting monomers.

3. The ultraviolet-hardenable adhesive as set forth in claim 1, wherein said at least one photoinitiator is selected from the group consisting of acetophenone and its derivatives; benzophenone and its derivatives; benzil; benzoin and its derivatives; benzildimethylketal; benzoylbenzoate; α-acryloxime esters; tetramethylthiuram monosulfide; thioxanthone and its derivatives; azo-compounds; benzoyl peroxide; di-tert-butyl peroxide and its derivatives; benzoyldiethoxyphosphine oxide; and trimethylbenzoyldiphenylphosphine oxide.

4. An ultraviolet-hardenable adhesive used for bonding a non-water swellable, ophthalmic-lens blank to a support member, in producing a non-water swellable ophthalmic lens, the adhesive consisting essentially of:
at least one photopolymerizing monomer;
at least one separation-promoting monomer for promoting separation of the bonded lens and support member from each other;
at least one photoinitiator; and
at least one photosensitizer;
said at least one photopolymerizing monomer being selected from the group consisting of acrylates or methacrylates represented by following general formulas (I) and (II):

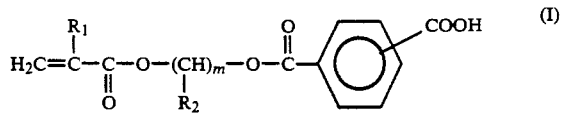

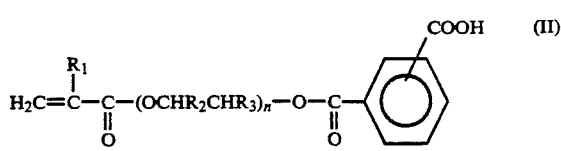

wherein
R₁ is hydrogen or methyl,
R₂ is hydrogen or methyl,
R₃ is hydrogen or methyl,
m is a positive integer from 2 to 10, and
n is a positive integer from 1 to 5;
said at least one separation-promoting monomer being selected from the group consisting of ethylenically unsaturated compounds represented by a following general formula (III):

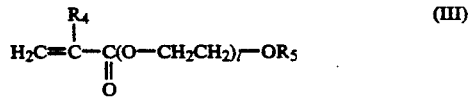

wherein
R₄ is hydrogen or methyl,
R₅ is hydrogen or methyl, and
l is a positive integer from 4 to 20;
the adhesive containing 40 to 80 parts by weight of said at least one photopolymerizing monomer and 60 to 20 parts by weight of said at least one separation-promoting monomer, per 100 parts by weight of the sum of said at least one photopolymerizing monomer and said at least one separation-promoting monomer; and
the adhesive containing 0.1 to 4 parts by weight of said at least one photoinitiator per 100 parts by weight of the sum of said at least one photopolymerizing monomer and said at least one separation-promoting monomer.

5. The ultraviolet-hardenable adhesive as set forth in claim 4, wherein said at least one photosensitizer is selected from the group consisting of amine derivatives; tri-n-butylphosphine; allylthiourea; s-benzylisothiuram-p-toluene sulfinate; and diethylaminoethyl methacrylate.

6. An ultraviolet-hardenable adhesive used for bonding a non-water swellable, ophthalmic-lens blank to a support member, in producing a non-water swellable ophthalmic lens, the adhesive consisting essentially of:
at least one photopolymerizing monomer;
at least one separation-promoting monomer for promoting separation of the bonded lens and support member from each other;
at least one photoinitiator; and
at least one member of the group consisting of photopolymerizing comonomer, stabilizer, and filler;
said at least one photopolymerizing monomer being selected from the group consisting of acrylates or methacrylates represented by following general formulas (I) and (III):

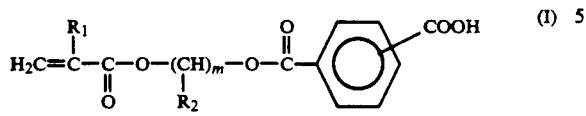

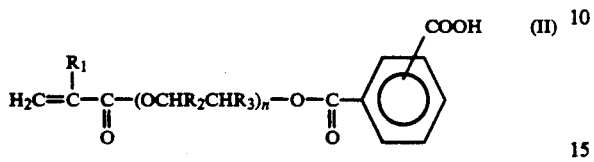

wherein
$R_1$ is hydrogen or methyl,
$R_2$ is hydrogen or methyl,
$R_3$ is hydrogen or methyl,
m is a positive integer from 2 to 10, and
n is a positive integer from 1 to 5;
said at least one separation-promoting monomer being selected from the group consisting of ethylenically unsaturated compounds represented by a following general formula (III):

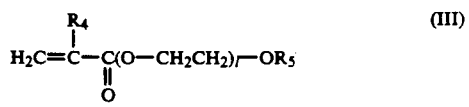

wherein
$R_4$ is hydrogen or methyl,
$R_5$ is hydrogen or methyl, and
l is a positive integer from 4 to 20;
the adhesive containing 40 to 80 parts by weight of said at least one photopolymerizing monomer and 60 to 20 parts by weight of said at least one separation-promoting monomer, per 100 parts by weight of the sum of said at least one photopolymerizing monomer and said at least one separation-promoting monomer; and
the adhesive containing 0.1 to 4 parts by weight of said at least one photoinitiator per 100 parts by weight of the sum of said at least one photopolymerizing monomer and said at least one separation-promoting monomer.

* * * * *